(12) United States Patent
Zuev

(10) Patent No.: US 9,075,864 B2
(45) Date of Patent: Jul. 7, 2015

(54) METHOD AND SYSTEM FOR SEMANTIC SEARCHING USING SYNTACTIC AND SEMANTIC ANALYSIS

(75) Inventor: Konstantin Zuev, Moscow (RU)

(73) Assignee: ABBYY InfoPoisk LLC (RU)

( * ) Notice: Subject to any disclaimer, the term of this patent is extended or adjusted under 35 U.S.C. 154(b) by 732 days.

(21) Appl. No.: 12/983,220

(22) Filed: Dec. 31, 2010

(65) Prior Publication Data
US 2012/0010872 A1    Jan. 12, 2012

Related U.S. Application Data

(63) Continuation-in-part of application No. 11/548,214, filed on Oct. 10, 2006, now Pat. No. 8,078,450.

(51) Int. Cl.
*G06F 17/27* (2006.01)
*G06F 17/30* (2006.01)

(52) U.S. Cl.
CPC ...... *G06F 17/30613* (2013.01); *G06F 17/2755* (2013.01); *G06F 17/277* (2013.01); *G06F 17/2785* (2013.01); *G06F 17/30684* (2013.01)

(58) Field of Classification Search
CPC .................. G06F 17/30619; G06F 17/30622; G06F 17/30705; G06F 17/30598; G06F 17/30864; G06F 17/3087
USPC ........ 704/9–10; 707/705, 708, 711, 713, 736, 707/739, 742
See application file for complete search history.

(56) References Cited

U.S. PATENT DOCUMENTS

| 5,268,839 A | 12/1993 | Kaji |
| 5,301,109 A | 4/1994 | Landauer et al. |
| 5,386,556 A | 1/1995 | Hedin et al. |

(Continued)

FOREIGN PATENT DOCUMENTS

| EP | 2400400 A1 | 12/2001 |
| WO | 2011160204 A1 | 12/2011 |

OTHER PUBLICATIONS

Bolshakov,I.A. "Co-Ordinative Ellipsis in Russian Texts: Problems of Description and Restoration", Proceedings of the 12th conference on Computational linguistics, vol. 1, pp. 65-67, Association of Computational Linguistics, Moscow, USSR, 1988.

(Continued)

*Primary Examiner* — Shaun Roberts
(74) *Attorney, Agent, or Firm* — LeighAnn Weiland; Veronica Weinstein

(57) ABSTRACT

In one embodiment, there is provided a computer-implemented method and system for implementing the method. The method comprises: preliminarily analyzing at least one corpus of natural language text comprising for each sentence of each natural language text of the corpus, performing syntactic analysis using linguistic descriptions to generate at least one syntactic structure for the sentence; building a semantic structure for the sentence; associating each generated syntactic and semantic structure with the sentence; and saving each generated syntactic and semantic structure; for each corpus of natural language text that was preliminarily analyzed, performing an indexing operation to index lexical meanings and values of linguistic parameters of each syntactic structure and each semantic structure associated with sentences in the corpus; and searching in at least one preliminarily analyzed corpora for sentences comprising searched values for the linguistic parameters.

19 Claims, 14 Drawing Sheets

(56) References Cited

U.S. PATENT DOCUMENTS

| | | | |
|---|---|---|---|
| 5,418,717 A | 5/1995 | Su et al. | |
| 5,678,051 A | 10/1997 | Aoyama | |
| 5,687,383 A | 11/1997 | Nakayama et al. | |
| 5,715,468 A | 2/1998 | Budzinski | |
| 5,752,051 A | 5/1998 | Cohen | |
| 5,787,410 A | 7/1998 | McMahon | |
| 6,006,221 A | 12/1999 | Liddy et al. | |
| 6,055,528 A | 4/2000 | Evans | |
| 6,076,051 A * | 6/2000 | Messerly et al. | 704/9 |
| 6,081,774 A * | 6/2000 | de Hita et al. | 704/9 |
| 6,182,028 B1 | 1/2001 | Karaali et al. | |
| 6,243,670 B1 | 6/2001 | Bessho et al. | |
| 6,246,977 B1 | 6/2001 | Messerly et al. | |
| 6,381,598 B1 | 4/2002 | Williamowski et al. | |
| 6,442,524 B1 | 8/2002 | Ecker et al. | |
| 6,601,026 B2 * | 7/2003 | Appelt et al. | 704/9 |
| 6,604,101 B1 | 8/2003 | Chan et al. | |
| 7,146,358 B1 | 12/2006 | Gravano et al. | |
| 7,200,550 B2 | 4/2007 | Menezes et al. | |
| 7,231,393 B1 | 6/2007 | Harik et al. | |
| 7,249,121 B1 | 7/2007 | Bharat et al. | |
| 7,263,488 B2 | 8/2007 | Chu et al. | |
| 7,272,595 B2 | 9/2007 | Tsuchitani et al. | |
| 7,383,258 B2 | 6/2008 | Harik et al. | |
| 7,406,542 B2 | 7/2008 | Erlingsson | |
| 7,426,507 B1 | 9/2008 | Patterson | |
| 7,475,015 B2 * | 1/2009 | Epstein et al. | 704/257 |
| 7,490,099 B2 | 2/2009 | Myers et al. | |
| 7,536,408 B2 | 5/2009 | Patterson | |
| 7,555,428 B1 | 6/2009 | Franz et al. | |
| 7,580,827 B1 | 8/2009 | Brants et al. | |
| 7,580,921 B2 | 8/2009 | Patterson | |
| 7,580,929 B2 | 8/2009 | Patterson | |
| 7,584,175 B2 | 9/2009 | Patterson | |
| 7,599,914 B2 | 10/2009 | Patterson | |
| 7,672,831 B2 | 3/2010 | Todhunter et al. | |
| 7,689,536 B1 | 3/2010 | Weissman et al. | |
| 7,693,813 B1 | 4/2010 | Cao et al. | |
| 7,698,259 B2 | 4/2010 | Xue | |
| 7,698,266 B1 | 4/2010 | Weissman et al. | |
| 7,711,679 B2 | 5/2010 | Patterson | |
| 7,716,216 B1 | 5/2010 | Harik et al. | |
| 7,792,783 B2 | 9/2010 | Friedlander et al. | |
| 7,792,836 B2 | 9/2010 | Taswell | |
| 7,831,531 B1 | 11/2010 | Baluja et al. | |
| 7,840,589 B1 | 11/2010 | Holt et al. | |
| 7,877,371 B1 | 1/2011 | Lerner et al. | |
| 7,895,221 B2 | 2/2011 | Colledge et al. | |
| 7,912,705 B2 | 3/2011 | Wasson et al. | |
| 7,913,163 B1 | 3/2011 | Zunger | |
| 7,925,610 B2 | 4/2011 | Elbaz et al. | |
| 7,925,655 B1 | 4/2011 | Power et al. | |
| 7,937,265 B1 | 5/2011 | Pasca et al. | |
| 7,937,396 B1 | 5/2011 | Pasca et al. | |
| 7,987,176 B2 | 7/2011 | Latzina et al. | |
| 8,010,539 B2 | 8/2011 | Blair-Goldensohn et al. | |
| 8,019,748 B1 | 9/2011 | Wu et al. | |
| 8,024,372 B2 | 9/2011 | Harik et al. | |
| 8,051,104 B2 | 11/2011 | Weissman et al. | |
| 8,055,669 B1 | 11/2011 | Singhal et al. | |
| 8,065,248 B1 | 11/2011 | Baluja et al. | |
| 8,065,316 B1 | 11/2011 | Baker et al. | |
| 8,078,450 B2 | 12/2011 | Anisimovich et al. | |
| 8,086,594 B1 | 12/2011 | Cao et al. | |
| 8,086,619 B2 | 12/2011 | Haahr et al. | |
| 8,086,624 B1 | 12/2011 | Hubinette | |
| 8,090,723 B2 | 1/2012 | Cao et al. | |
| 8,108,412 B2 | 1/2012 | Patterson | |
| 8,112,437 B1 | 2/2012 | Katragadda et al. | |
| 8,117,223 B2 | 2/2012 | Patterson | |
| 8,122,026 B1 | 2/2012 | Laroco, Jr. et al. | |
| 8,145,473 B2 | 3/2012 | Anisimovich et al. | |
| 8,166,021 B1 | 4/2012 | Cao et al. | |
| 8,214,199 B2 | 7/2012 | Anismovich et al. | |
| 8,229,730 B2 | 7/2012 | Van Den Berg et al. | |
| 8,229,944 B2 | 7/2012 | Latzina et al. | |
| 8,271,453 B1 | 9/2012 | Pasca et al. | |
| 8,285,728 B1 | 10/2012 | Rubin | |
| 8,301,633 B2 | 10/2012 | Cheslow | |
| 8,402,036 B2 | 3/2013 | Blair-Goldensohn et al. | |
| 8,577,907 B1 | 11/2013 | Singhal et al. | |
| 2004/0098250 A1 | 5/2004 | Kimchi et al. | |
| 2005/0065916 A1 | 3/2005 | Ge et al. | |
| 2005/0240392 A1 | 10/2005 | Munro, Jr. et al. | |
| 2005/0267871 A1 | 12/2005 | Marchisio et al. | |
| 2006/0106767 A1 | 5/2006 | Adcock et al. | |
| 2006/0106793 A1 | 5/2006 | Liang | |
| 2006/0149739 A1 | 7/2006 | Myers | |
| 2006/0184516 A1 | 8/2006 | Ellis | |
| 2007/0083505 A1 | 4/2007 | Ferrari et al. | |
| 2007/0130112 A1 | 6/2007 | Lin | |
| 2007/0156669 A1 | 7/2007 | Marchisio et al. | |
| 2007/0185860 A1 | 8/2007 | Lissack | |
| 2008/0133483 A1 | 6/2008 | Bayley et al. | |
| 2008/0133505 A1 | 6/2008 | Bayley et al. | |
| 2008/0243777 A1 | 10/2008 | Stewart et al. | |
| 2008/0294622 A1 | 11/2008 | Kanigsberg et al. | |
| 2008/0319947 A1 | 12/2008 | Latzina et al. | |
| 2009/0049040 A1 | 2/2009 | Fay et al. | |
| 2009/0063472 A1 | 3/2009 | Pell et al. | |
| 2009/0076839 A1 | 3/2009 | Abraham-Fuchs et al. | |
| 2009/0089047 A1 | 4/2009 | Pell et al. | |
| 2009/0089277 A1 | 4/2009 | Cheslow | |
| 2009/0112841 A1 | 4/2009 | Devarakonda et al. | |
| 2009/0182738 A1 | 7/2009 | Marchisio et al. | |
| 2009/0222441 A1 | 9/2009 | Broder et al. | |
| 2009/0271179 A1 | 10/2009 | Marchisio et al. | |
| 2010/0095196 A1 | 4/2010 | Grabarnik et al. | |
| 2010/0169314 A1 | 7/2010 | Green et al. | |
| 2010/0169337 A1 | 7/2010 | Green et al. | |
| 2010/0318423 A1 | 12/2010 | Kanigsberg et al. | |
| 2010/0332493 A1 | 12/2010 | Haas et al. | |
| 2011/0040772 A1 | 2/2011 | Sheu | |
| 2011/0055188 A1 | 3/2011 | Gras | |
| 2011/0072021 A1 | 3/2011 | Lu et al. | |
| 2011/0119254 A1 | 5/2011 | Brown et al. | |
| 2011/0153539 A1 | 6/2011 | Rojahn | |
| 2011/0202526 A1 | 8/2011 | Lee et al. | |
| 2011/0202563 A1 | 8/2011 | Colledge et al. | |
| 2011/0301941 A1 | 12/2011 | De Vocht | |
| 2011/0314032 A1 | 12/2011 | Bennett et al. | |
| 2012/0023104 A1 | 1/2012 | Johnson et al. | |
| 2012/0030226 A1 | 2/2012 | Holt et al. | |
| 2012/0047145 A1 | 2/2012 | Heidasch | |
| 2012/0131060 A1 | 5/2012 | Heidasch et al. | |
| 2012/0197885 A1 | 8/2012 | Patterson | |
| 2012/0203777 A1 | 8/2012 | Laroco, Jr. et al. | |
| 2012/0221553 A1 | 8/2012 | Wittmer et al. | |
| 2012/0246153 A1 | 9/2012 | Pehle | |
| 2012/0296897 A1 | 11/2012 | Xin-Jing et al. | |
| 2013/0013291 A1 | 1/2013 | Bullock et al. | |
| 2013/0054589 A1 | 2/2013 | Cheslow | |
| 2013/0091113 A1 | 4/2013 | Gras | |
| 2013/0254209 A1 | 9/2013 | Kang et al. | |

OTHER PUBLICATIONS

Hutchins, Mashine Translation: Past, Present, Future, Ellis Horwood, Ltd., Chichester, UK, 1986.

Mitamura, "An Efficient Interlingua Translation System for Multi-Lingual Document Production", Proceedings of Machine Translation Summit III, Washington DC, Jul. 2-4, 1991.

\* cited by examiner

Figure 13

METHOD AND SYSTEM FOR SEMANTIC SEARCHING USING SYNTACTIC AND SEMANTIC ANALYSIS

This application is a continuation-in-part of U.S. Ser. No. 11/548,214, filed on Oct. 10, 2006, the entire specification of which is incorporated herein by reference.

FIELD

Embodiments of the present invention relate to search technology. In particular, embodiments of the present invention relate to searching of electronic content available, for example, on the Internet and in other electronic resources, such as text corpora, dictionaries, glossaries, encyclopedias, etc.

BACKGROUND

The inventor is aware of search technology that generates search results based on certain keywords entered by a user as part of the search query.

However, due to homonymy and homography in natural languages, a search result based on a keyword search may include a substantial amount of non-relevant or marginally relevant information. For example, if the user searches for texts with the word "page" in the sense of "a man or boy employed as the personal attendant to a queen," the user may receive a large number of non-relevant information where "page" refers to an Internet page, a page of a newspaper or magazine, a section of stored data, etc. This is likely to happen because those other senses of the word "page" are substantially more frequent.

SUMMARY

According to a first aspect of the invention, there is provided a computer-implemented method, comprising:

preliminarily analyzing at least one corpus natural language text comprising for each sentence of each natural language text of the corpora, performing syntactic analysis using linguistic descriptions to generate at least one syntactic structure for the sentence;

building a semantic structure for the sentence; and associating each generated syntactic and semantic structure with the sentence;

for each corpus of natural language text that was preliminarily analyzed, performing an indexing operation to index lexical meanings and values of linguistic parameters of each syntactic structure and each semantic structure associated with sentences in the corpora; and searching in at least one preliminary analyzed corpus for sentences comprising searched values for the linguistic parameters.

According to a second aspect of the invention, there is provided a system for implementing the aforesaid method.

Other aspects of the invention will be apparent from the detailed description below.

BRIEF DESCRIPTION OF THE DRAWINGS

FIG. 13 shows still another example of query using semantic relations and semantic classes or lexical meanings.

DETAILED DESCRIPTION

Figure 1:
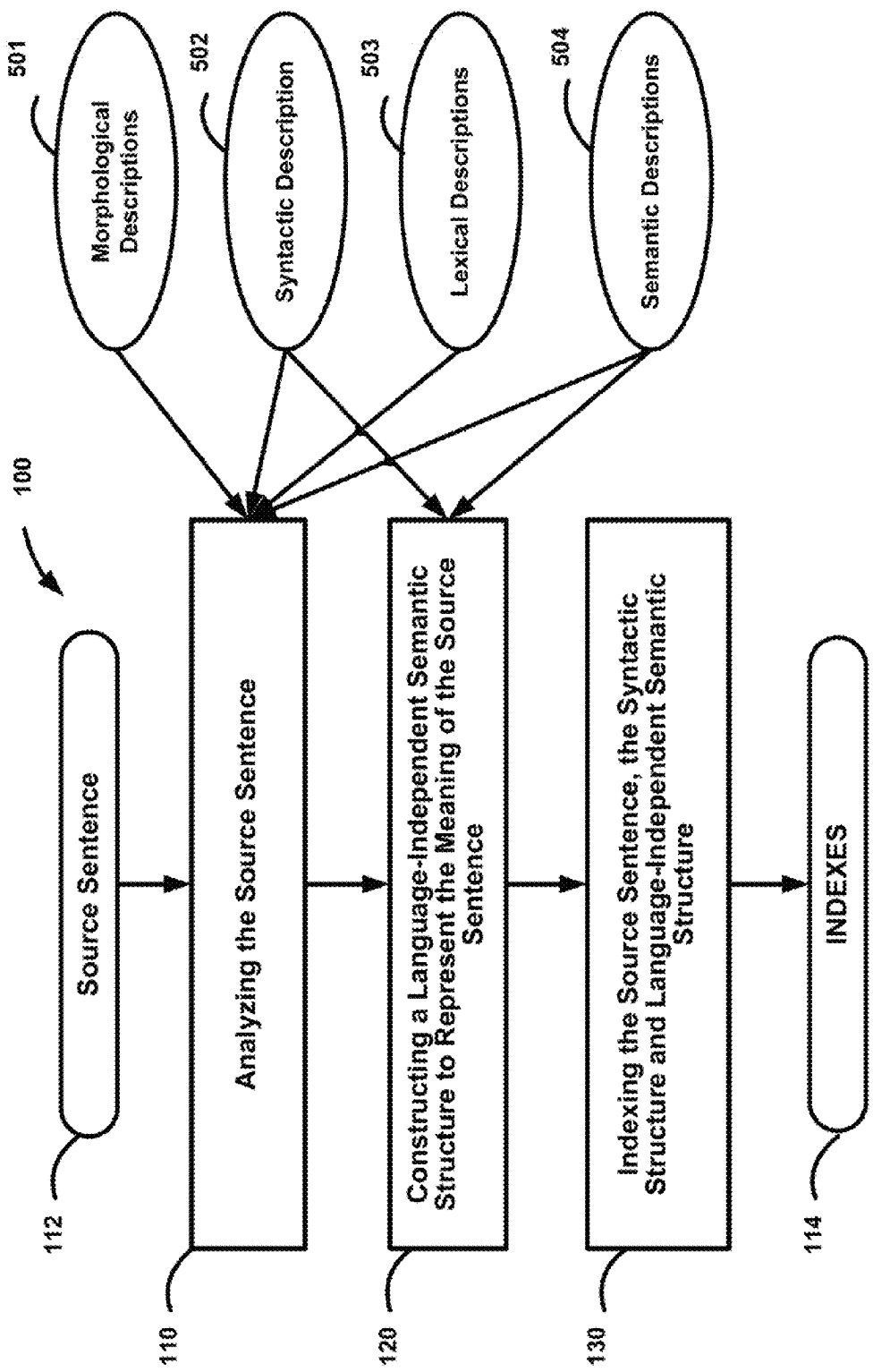
FIG. 1 illustrates a flow chart of a method 100 for preprocessing source sentences 112 in a source natural language prior to search.

In the following description, for purposes of explanation, numerous specific details are set forth in order to provide a thorough understanding of the invention. It will be apparent, however, to one skilled in the art that the invention can be practiced without these specific details.

Reference in this specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Embodiments of the present invention disclose indexing techniques and systems for indexing natural language texts. Sematic search techniques and systems are also disclosed.

Broadly, one indexing technique disclosed herein comprises performing fully-fledged syntactic and semantic analysis of natural language texts to build an index for each natural language text. Advantageously, all syntactic and semantic information about each sentence in the natural language texts generated pursuant to the syntactic and semantic analysis is saved. The saved information may include interim parsing results and lexical choices, including the results obtained when resolving ambiguities.

The index so produced may be used to allow semantic searching of the natural language text, as will be described later.

The existing search systems make it possible to use simple query languages to find documents that either contain or do not contain the words or word combinations specified by the user. However, the user cannot specify whether the search words should occur within one sentence or not. Also, the user cannot formulate a query for a set of words that belong to a certain class. And finally, the existing search systems do not allow users to find sentences based on their syntactic or semantic properties, e.g. examples illustrating a certain syntactic relationship, examples illustrating a semantic relationship, or searches based on grammatical meanings, deep or surface slots, syntactic models, style and/or semantic features, etc. These types of searches may be of use to lexicographers, philologists, linguists, and students and teachers of native or foreign languages, and many other peoples.

Advantageously, the problems associated with existing search systems are overcome or at least reduced by the techniques and systems disclosed herein.

Further, embodiments of the invention allows a user to search and to find relevant information using a semantic query that can be expressed in specific semantic query language, and also in a natural language. The same analyzer will analyze the question to recognize its syntactical structure, to build its semantic structure, and in such a way "understanding" the meaning of the query. Searching is implemented in accordance with syntax and semantic of information which is included in searchable resources. So, a user can get only relevant output.

Co-pending application U.S. Ser. No. 11/548,214 discloses a syntactic and semantic analysis methods (hereinafter "the analysis methods"). The analysis methods may be used to perform the analysis step of the disclosed indexing techniques. The analysis methods use a large number of exhaustive linguistic descriptions of a given natural language to reflect all the real complexities of the natural language, rather than simplified or artificial descriptions, without the danger of a combinatorial explosion. Moreover, the analysis methods are based on a principle of integral and purpose-driven recognition, i.e. hypotheses about the structure of a part of a sentence are verified based on hypotheses about the structure of the whole sentence. This obviates the need to analyze numerous parsing anomalies or variants.

The analysis methods will now be described, in accordance with one embodiment. Referring to FIG. 1, there is shown a method 100 for preprocessing source sentences 112 in a source natural language prior to search. At step 110, the source sentences are analyzed using linguistic descriptions useful for analyzing the source sentence. The linguistic descriptions may include morphological descriptions, syntactic descriptions, lexical descriptions, and semantic descriptions. In one embodiment, all available linguistic models and knowledge about natural languages may be arranged in a database and applied for analyzing each source sentence. Integral models for describing the syntax and semantics of the source language are used, in one embodiment, in order to recognize the meanings of the source sentence, analyze complex language structures, and correctly convey information encoded in the source sentence.

When analyzing the meaning of the source sentence, a two-step analysis algorithm (e.g., rough syntactic analysis and precise syntactic analysis) may be implemented to make use of linguistic models and knowledge at various levels, to calculate probability ratings and to generate the most probable syntactic structure, e.g., a best syntactic structure.

Figure 2:
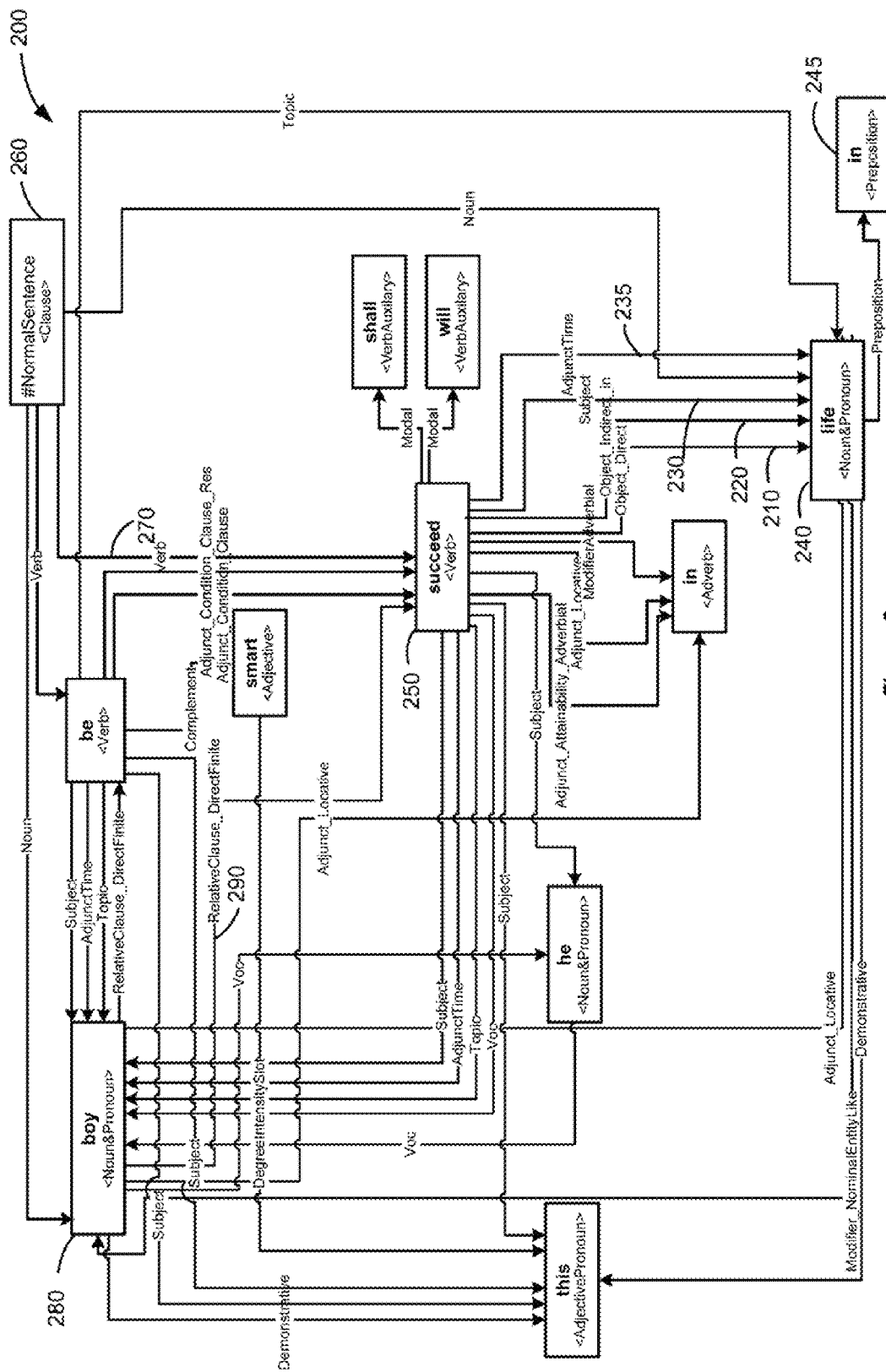
FIG. 2 illustrates an example of a graph of generalized constituents obtained as a result of rough syntactic analysis of the sentence "This boy is smart, he'll succeed in life."

Accordingly, a rough syntactic analysis is performed on the source sentence to generate a graph of generalized constituents for further syntactic analysis. All the possible surface syntactic models for each element of lexical-morphological structure are applied, and all the possible constituents are built and generalized to represent all the possible variants of parsing the sentence syntactically. FIG. 2 illustrates an example of a graph of generalized constituents obtained as a result of rough syntactic analysis of the sentence "This boy is smart, he'll succeed in life."

Figure 3:
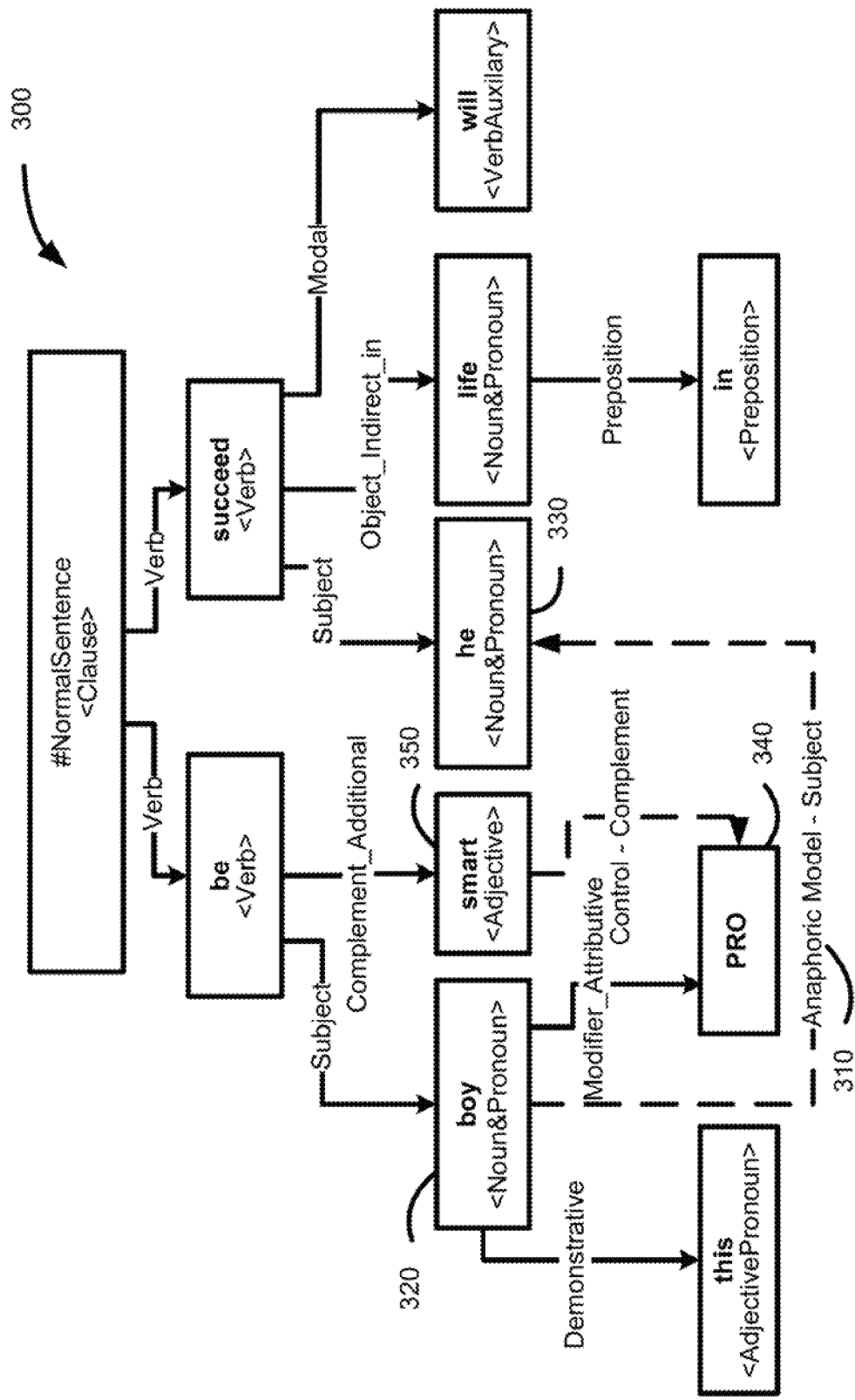
FIG. 3 shows an example of a syntactic tree, obtained as a result of precise syntactic analysis of the sentence "This boy is smart, he'll succeed in life."

Following the rough syntactic analysis, a precise syntactic analysis is performed on the graph of generalized constituents from the graph of the generalized constituents to generate one or more syntactic trees to represent the source sentence. In one embodiment, generating the syntactic tree may comprise choosing between lexical options, and choosing between relations from the graphs. Many prior and statistical ratings may be used during in choosing between the lexical options, and in choosing between relations from the graph. The prior and statistical ratings may also be used for assessment of parts of the generated tree and the tree in whole. In one embodiment, the syntactic trees may be generated in order of decreasing assessment. Thus, the best syntactic tree may be generated first. Non-tree links are also checked and generated for each syntactic tree at this step. If the first generated syntactic tree fails, for example, because of impossibility to establish the non-tree links, the second syntactic tree is taken as the best, etc. FIG. 3 shows an example of a syntactic tree, obtained as a result of precise syntactic analysis of the sentence "This boy is smart, he'll succeed in life." This tree contains complete syntactic information, such as lexical meanings, parts of speech, syntactic roles, grammatical values, syntactic relations (slots), syntactic models, non-tree link types, etc.

This novel two-step syntactic analysis approach ensures that the meaning of the source sentence is accurately represented by the best syntactic structure chosen from the one or more syntactic trees. Advantageously, the two-step analysis approach follows a principle of integral and purpose-driven recognition, i.e. hypotheses about the structure of a part of a sentence are verified using all available linguistic descriptions within the hypotheses about the structure of the whole sentence. This approach avoids the need to analyze numerous parsing anomalies or variants known to be invalid.

At step 120, after the source sentence is analyzed, the syntactic structure of the sentence is semantically interpreted, and a language-independent semantic structure is constructed to represent the meaning of the source sentence. The language-independent semantic structure is a generalized data structure in language-independent form/format. Such a novel language-independent semantic structure is generated for each source sentence to accurately describe the meaning of the source sentence and can be applied to various applications, including, but not limited to, automated abstracting, machine translation, control systems, information retrieval or search, etc.

Figure 4:
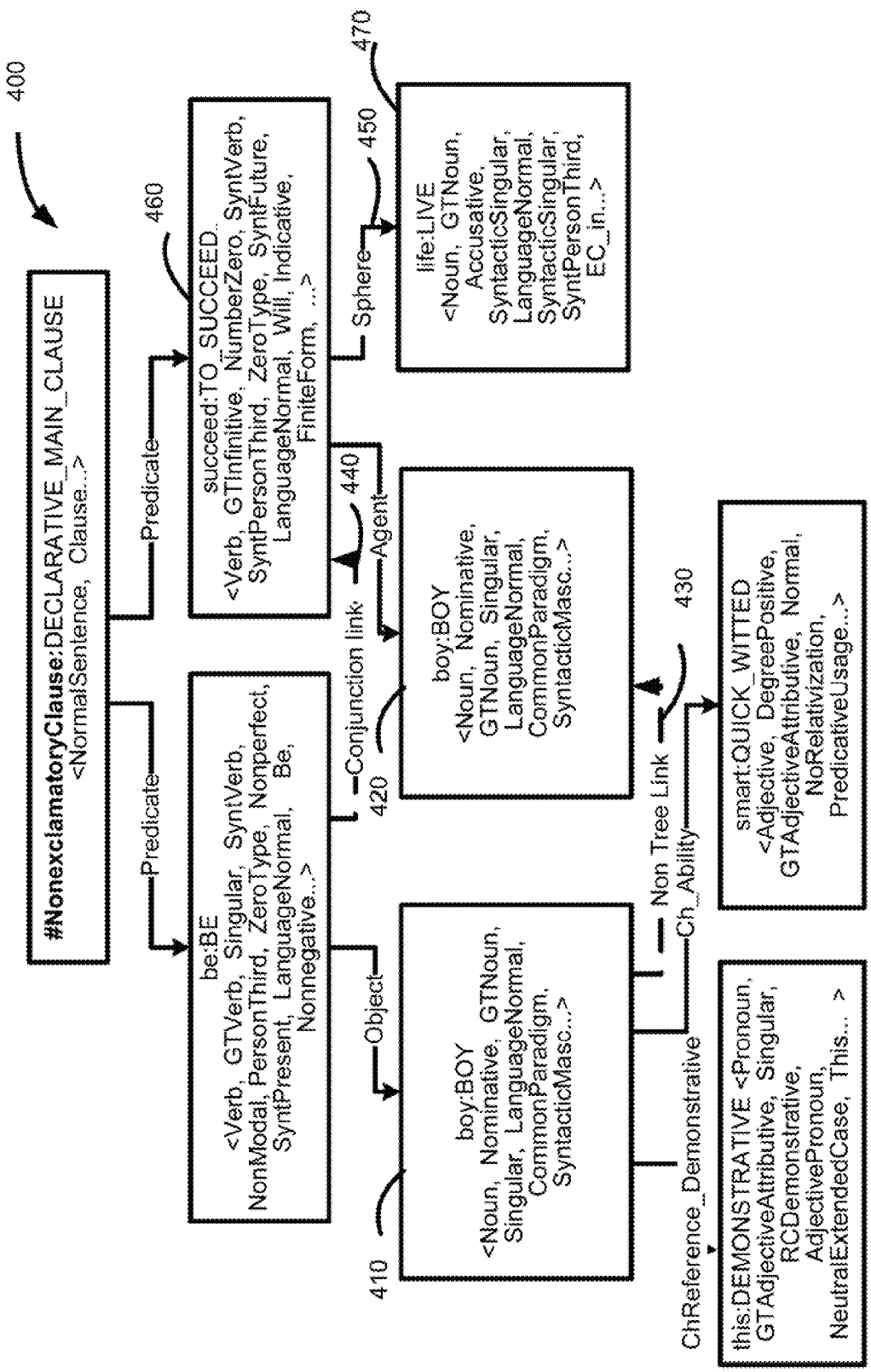
FIG. 4 shows an example of a semantic structure, obtained for the sentence "This boy is smart, he'll succeed in life."

The disclosed analysis methods ensure that the maximum accuracy in conveying or understanding the meanings of the source sentence is achieved. FIG. 4 shows an example of a semantic structure, obtained for the sentence "This boy is smart, he'll succeed in life." This structure contains all syntactic and, additionally, semantic information, such as semantic class, semantemes, semantic relations (deep slots), etc.

Figure 5:
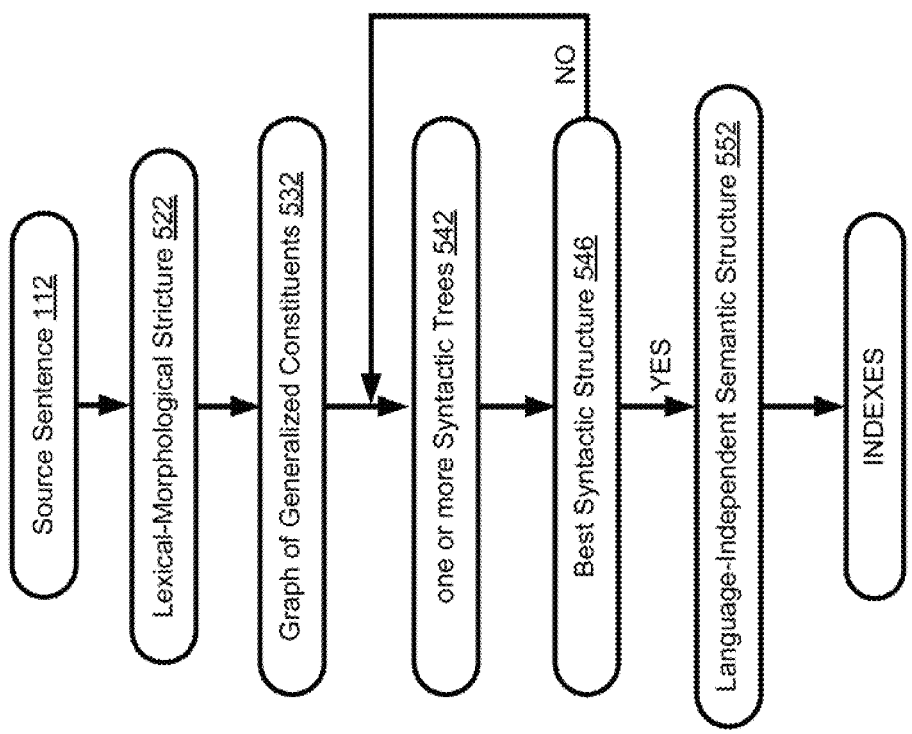
FIG. 5 illustrates converting a source sentence into a language independent semantic structure through various structures according to an exemplary embodiment of the invention and the linguistic descriptions employed.

FIG. 5 illustrates converting a source sentence into a language independent semantic structure through various structures according to an exemplary embodiment of the invention and the linguistic descriptions employed.

Figure 6:
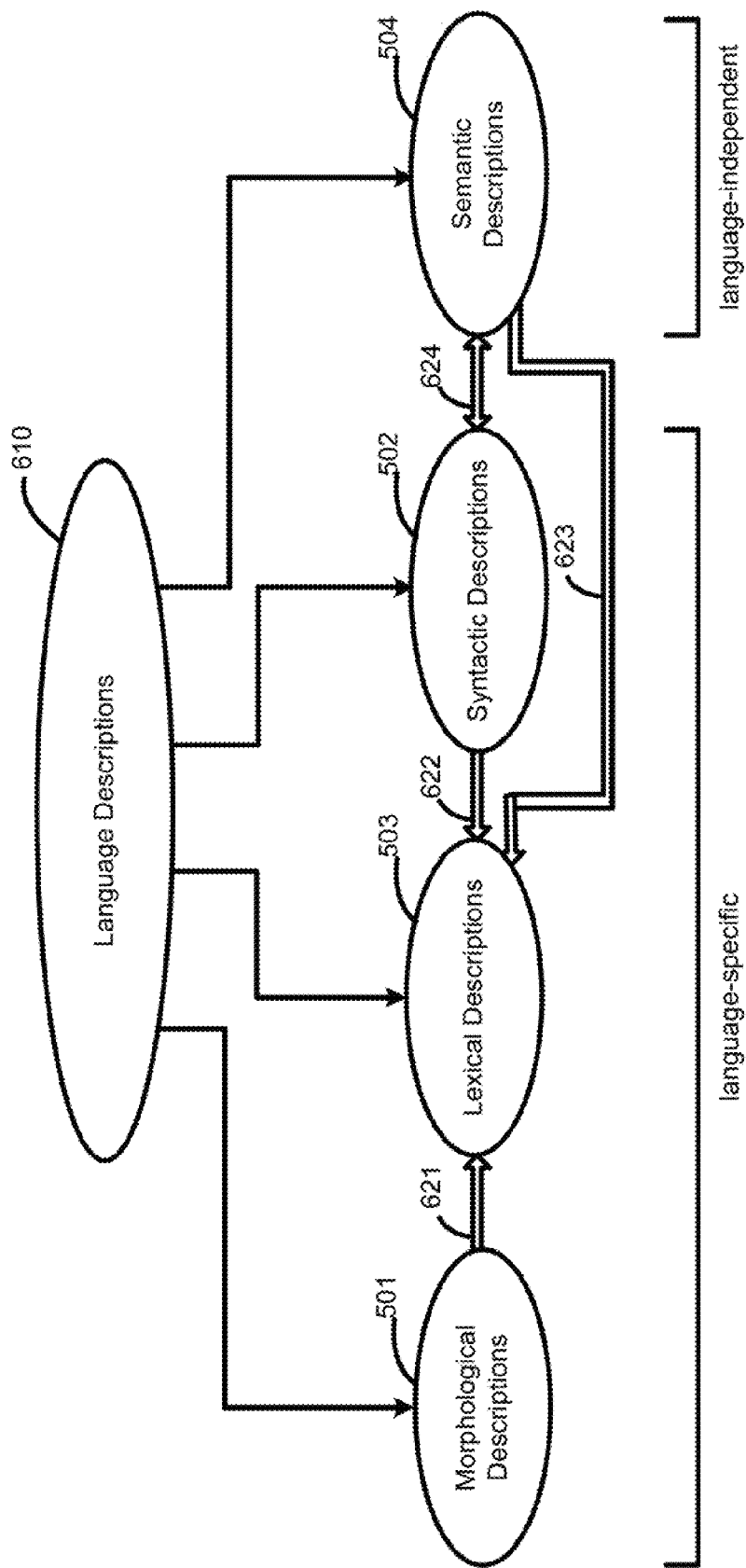
FIG. 6 is a diagram illustrating linguistic descriptions according to one exemplary embodiment of the invention.

FIG. 6 is a diagram illustrating linguistic descriptions 610 according to one exemplary embodiment of the invention. As will be seen, the descriptions 610 comprise morphological descriptions 501, syntactic descriptions 502, lexical descriptions, 503 and semantic descriptions 502 are joined into one common concept. The core of the descriptions 610 is a semantic hierarchy, which links together language-independent semantic descriptions and language-specific lexical, morphological, and syntactic descriptions for each language.

Semantic hierarchy may include semantic notions or semantic entities referred to herein as "semantic classes". The semantic classes may be arranged into a semantic hierarchy comprising hierarchical parent-child relationships. In general, a child semantic class inherits most properties of its direct parent and all ancestral semantic classes. For example, semantic class SUBSTANCE is a child of semantic class ENTITY and at the same time it is a parent of semantic classes GAS, LIQUID, METAL, WOOD_MATERIAL, etc.

Each semantic class in the semantic hierarchy is supplied with a deep model. The deep model of the semantic class is a set of the deep slots, which reflect the semantic roles of child constituents in various sentences with objects of the semantic class as the core of a parent constituent and the possible semantic classes as fillers of deep slots. The deep slots express semantic relationships between constituents, including, for example, "agent", "addressee", "instrument", "quantity", etc. A child semantic class inherits and adjusts the deep model of its direct parent semantic class.

Figure 9:
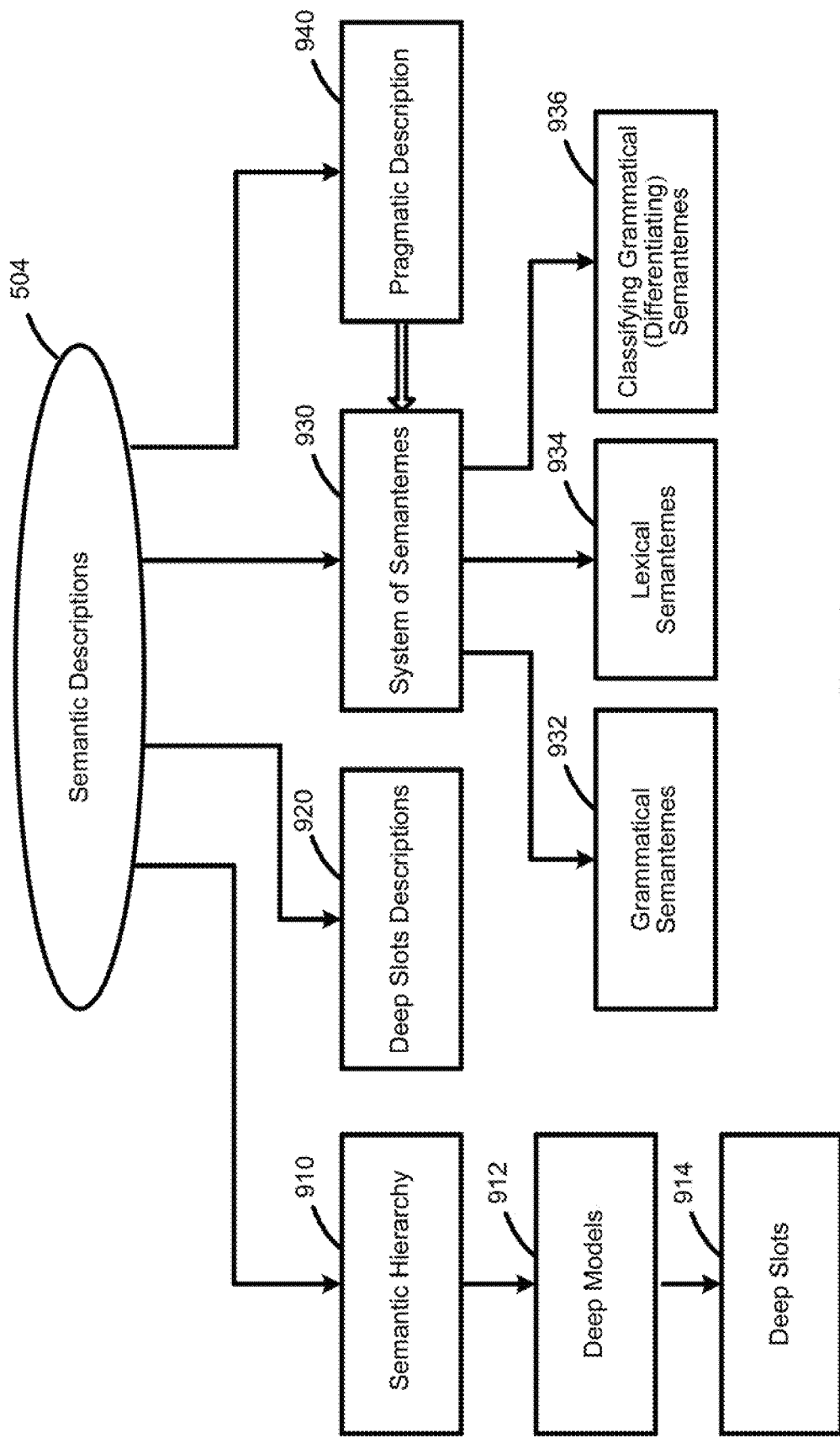
FIG. 9 is a diagram illustrating semantic descriptions according to one exemplary embodiment of the invention.

The semantic descriptions 504 are language-independent. The semantic descriptions 504 may provide descriptions of deep constituents, and may comprise a semantic hierarchy, deep slots descriptions, a system of semantemes, and pragmatic descriptions. FIG. 9 is a diagram illustrating semantic descriptions according to one exemplary embodiment of the invention.

Deep slots reflect the semantic, roles of child constituents in the deep models. The deep slots descriptions also contain grammatical and semantic restrictions on possible fillers of the deep slots. The properties and restrictions for the deep slots and their possible fillers are very similar and oftentimes identical among different languages.

System of semantemes represents a set of semantic categories. As an example, a semantic category "DegreeOfComparison", can be used to describe the degrees of comparison expressed by various forms of adjectives, for example, "easy", "easier" and "easiest". So, the semantic category "DegreeOfComparison" may include such semantemes as, for example, "Positive", "ComparativeHigherDegree", "SuperlativeHighestDegree", among others. As another example, a semantic category "RelationToReferencePoint" can be used to describe an order as before or after a reference point relative to some event or object, etc., and its semantemes may include, "Previous", "Subsequent", and the order may be spatial or temporal in a broad sense. As yet another example, "EvaluationObjective", as a semantic category, may describe an objective assessment, such as "Bad", "Good", etc.

The systems of semantemes include language-independent semantic attributes that express semantic characteristics as well as stylistic, pragmatic and communicative characteristics. Semantemes can also be used to express an atomic meaning that finds a regular grammatical and/or lexical expression in a language. By purpose and usage, semantemes may be divided into various kinds, including, but not limited to, grammatical semantemes, lexical semantemes, and classifying grammatical (differentiating) semantemes.

Grammatical semantemes are used to describe grammatical properties of constituents when transforming a syntactic tree (a language dependent object) into a semantic structure, lexical semantemes describe specific properties of objects (for example, "being flat" or "being liquid") and are used in the deep slot descriptions 920 as restriction for deep slot fillers (for example, for the verbs "face (with)" and "flood", respectively). Classifying grammatical (differentiating) semantemes express differentiating properties of objects within a single semantic class. For example, in the semantic class "HAIRDRESSER" the semanteme <<Related-ToMen>> is assigned to the lexical meaning "barber", unlike other lexical meanings which also belong to this class, such as "hairdresser"; "hairstylist", etc.

Pragmatic descriptions are used to assign a corresponding theme, style or genre to texts and objects of the semantic hierarchy. For example, "Economic Policy", "Foreign Policy", "Justice", "Legislation", "Trade", "Finance", etc.

The morphological descriptions, the lexical descriptions, the syntactic descriptions, and the semantic descriptions may be related. A lexical meaning may have one or more surface (syntactic) models that may be provided by semantemes and pragmatic characteristics. The syntactic descriptions and the semantic descriptions are also related. For examples, diatheses of the syntactic descriptions can be considered as the "interface" between the language-specific surface models and language-independent deep models of the semantic description.

Figure 7:
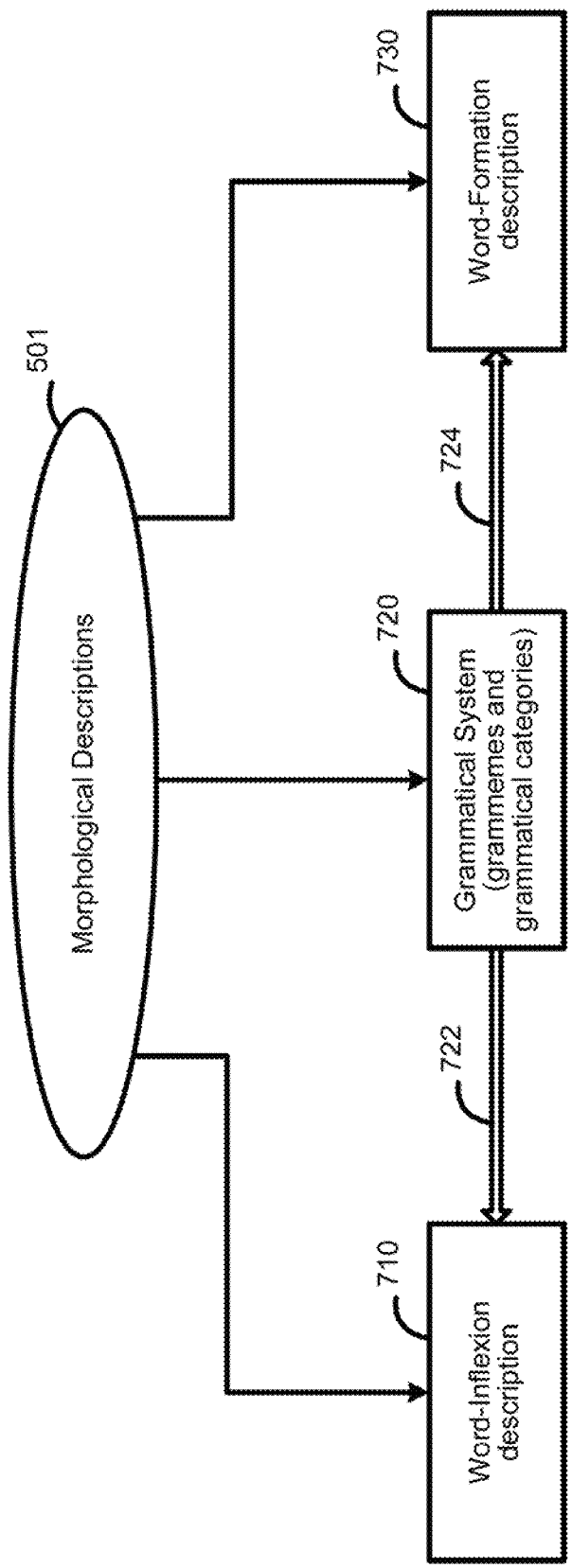
FIG. 7 illustrates exemplary morphological descriptions.

FIG. 7 illustrates exemplary morphological descriptions. As shown, the components of the morphological descriptions 501 include, but are not limited to, word-inflexion description, grammatical system (e.g., grammemes), and word-formation description. In one embodiment, grammatical system 720 includes a set of grammatical categories, such as, "Part of speech", "Case", "Gender", "Number", "Person", "Reflexivity", "Tense", "Aspect", etc. and their meanings, hereafter referred to as "grammemes". For example, part of speech grammemes may include "Adjective", "Noun", "Verb", etc.; case grammemes may include "Nominative", "Accusative", "Genitive", etc.; and gender grammemes may include "Feminine", "Masculine", "Neuter", etc.

Word-inflexion description describes how the main form of a word form may change according to its case, gender, number, tense, etc. and broadly includes all possible forms for a given word. Word-formation 730 describes which new words may be generated involving a given word. The grammemes are units of the grammatical systems 720 and, as shown by a link 722 and a link 724, the grammemes can be used to build the word-inflexion description 710 and the word-formation description 730.

Figure 8:
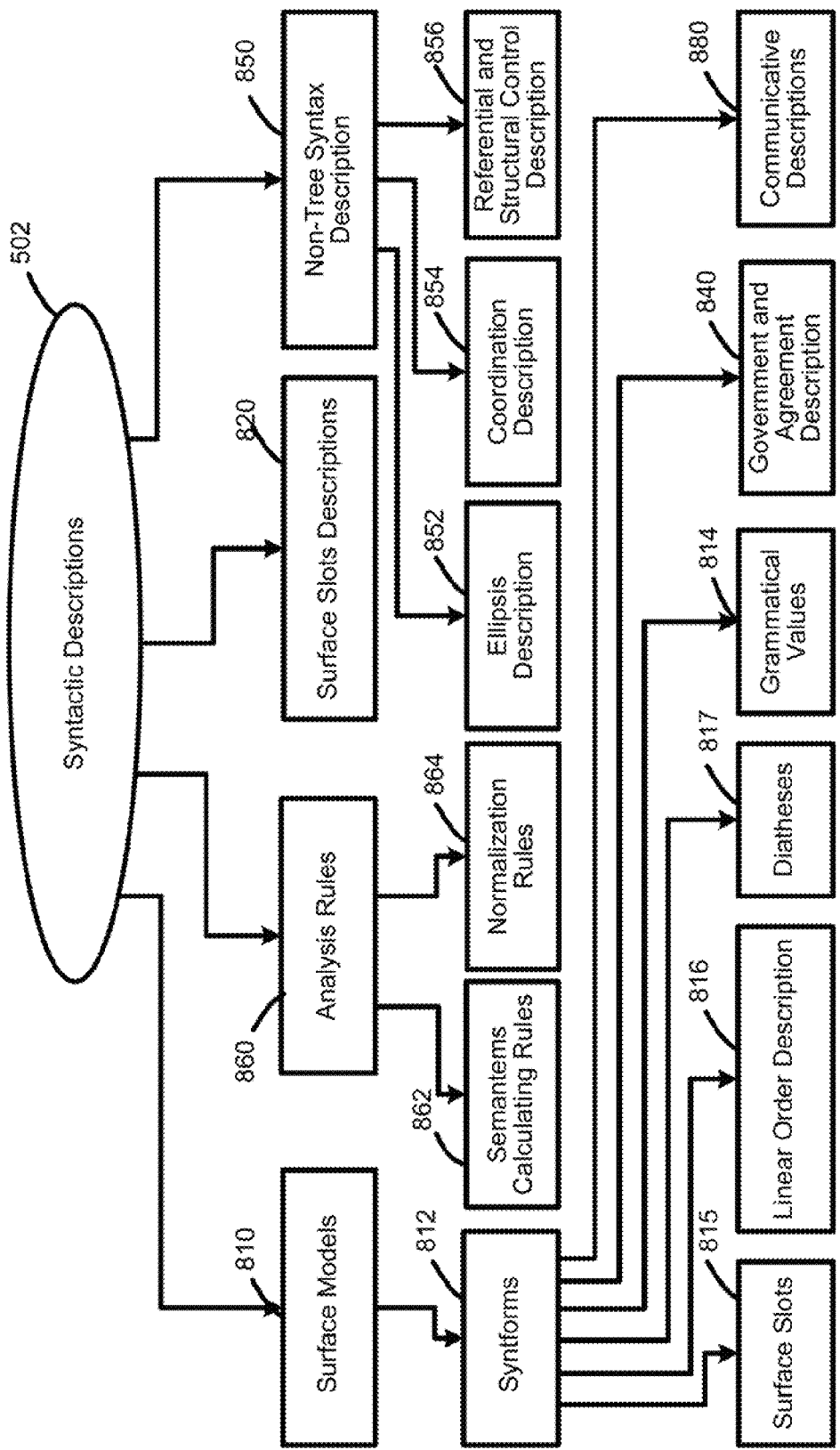
FIG. 8 illustrates exemplary syntactic descriptions.
Figure 10:
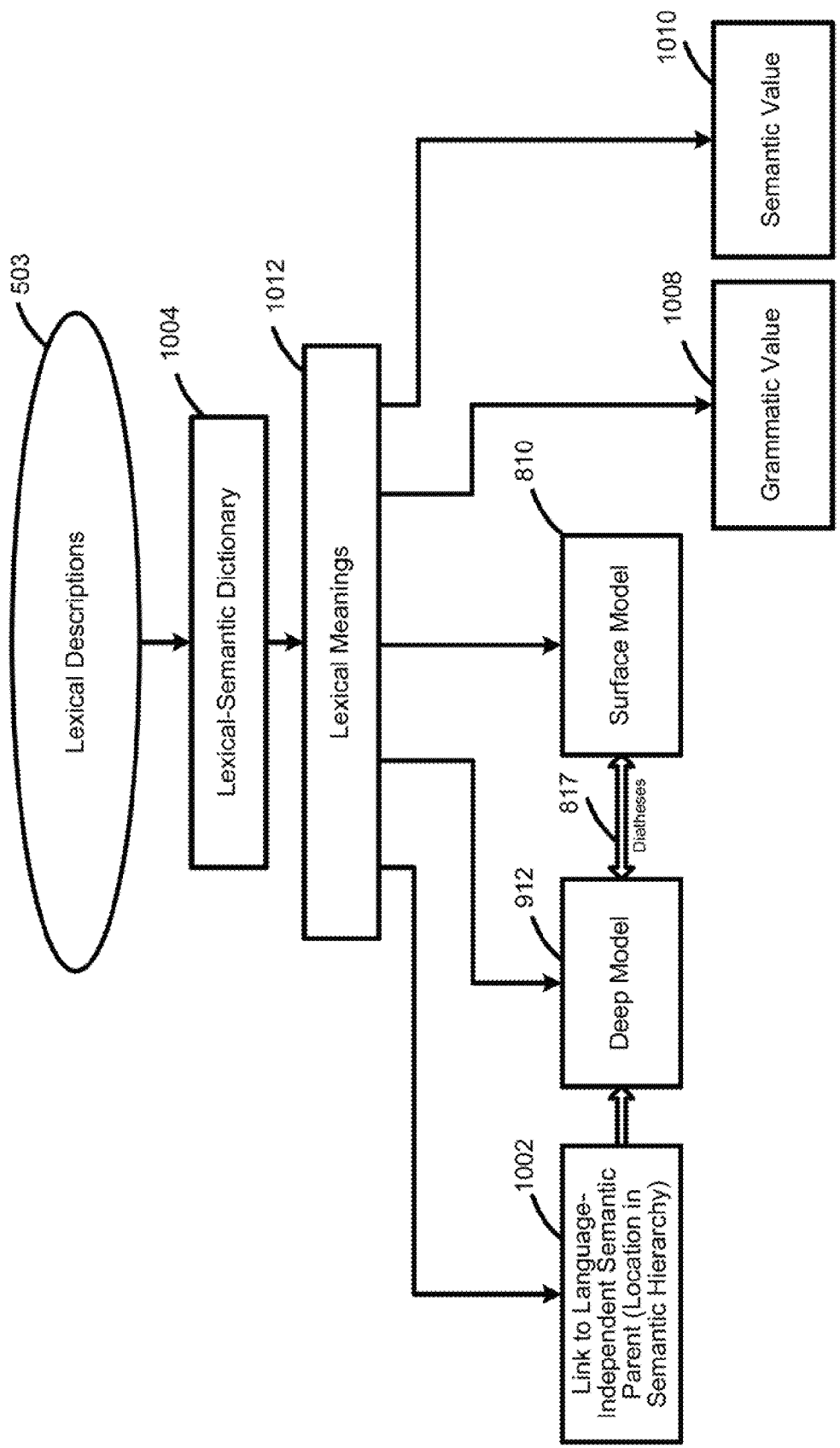
FIG. 10 is a diagram illustrating lexical descriptions according to one exemplary embodiment of the invention.

FIG. 8 illustrates exemplary syntactic descriptions. The components of the syntactic descriptions 502 may comprise surface models, surface slot descriptions, referential and structural control description, government and agreement description, non-tree syntax description, and analysis rules. The syntactic descriptions are used to construct possible syntactic structures of a source sentence from a given source language, taking into account free linear word order, non-tree syntactic phenomena (e.g., coordination, ellipsis, etc.), referential relationships, and other considerations. FIG. 10 is a diagram illustrating lexical descriptions according to one exemplary embodiment of the invention. The lexical descriptions include Lexical-Semantic Dictionary which contains a set of lexical meanings arranged with their semantic classes into Semantic hierarchy, where each lexical meaning may include, but are not limited to, its deep model, surface model, grammatical value and semantic value.

Returning to FIG. 1, at step 130, after the language-independent semantic structure is constructed, then selected syntactic structure and the semantic structure are indexed. Each parameter of the morphological, syntactic, lexical, and semantic descriptions can be indexed in the same fashion as each word in a document is indexed. An index usually comprises a table where each word (each lexeme or word form) in a document is accompanied by a list of numbers or addresses of its occurrences in that document. According to embodiments of the present invention, an index is produced to index all values, of morphological, syntactic, lexical, and semantic parameters. These parameters values were generated during the two-stage semantic analysis described above. The index may be used to facilitate semantic searching of the natural language source text. Thus, for example, a user may search for all sentences containing nouns with the property "being flat" or "being liquid", or all sentences containing nouns or verbs denoting processes of creating something, or destructing, or moving, etc.

Combinations of two, three, or, generally, n numbers can be used to index various syntactic, semantic or other parameters. For example, to index surface or deep slots, for each slot, combinations of two numbers of words that are linked by the relationship corresponding to these slots can be used. For example, referring to the example of a semantic structure obtained for the sentence "This boy is smart, he'll succeed in life", the deep slot 'Sphere' (450) relates the lexical meaning succeed:TO_SUCCEED (460) with the lexical meaning life:LIVE (470). More particularly, life:LIVE fills the deep slot 'Sphere' of the verb succeed:TO_SUCCEED. When the index of lexical meanings is built, in accordance with the techniques disclosed herein, these occurrences of the lexical meanings are assigned numbers based on the position of the occurrences within the document, for example, N1 and N2, respectively. When the index of deep slots is built, every deep slot has a corresponding list of occurrences in the document. For example, the index of the deep slot 'Sphere' will include the pair (N1, N2) among others.

Since not only words are indexed, but semantic classes, syntactic and semantic relations, any other elements of syntactic and semantic structures too, it becomes possible to search contexts including not only words, but also contexts including lexical meanings, semantic classes, contexts including words having the same syntactic features or/and semantic features or/and morphological features or a sets of such features. Additionally, sentences with non-tree syntax phenomena, for example, ellipsis, coordination etc. may be found. Since it possible to search semantic classes, sets of semantically associated words and notions may be found.

It is also possible to find fragments of syntactic and/or semantic structures. The results of searching may be sentences or paragraphs, or any other fragments as a user wants and selects the corresponding option. Since all sentences in corpora are analyzed and saved with all results of their syntactic and semantic analyses, the syntactic and/or semantic structures of the found sentences may be graphically shown to user.

Figure 11:
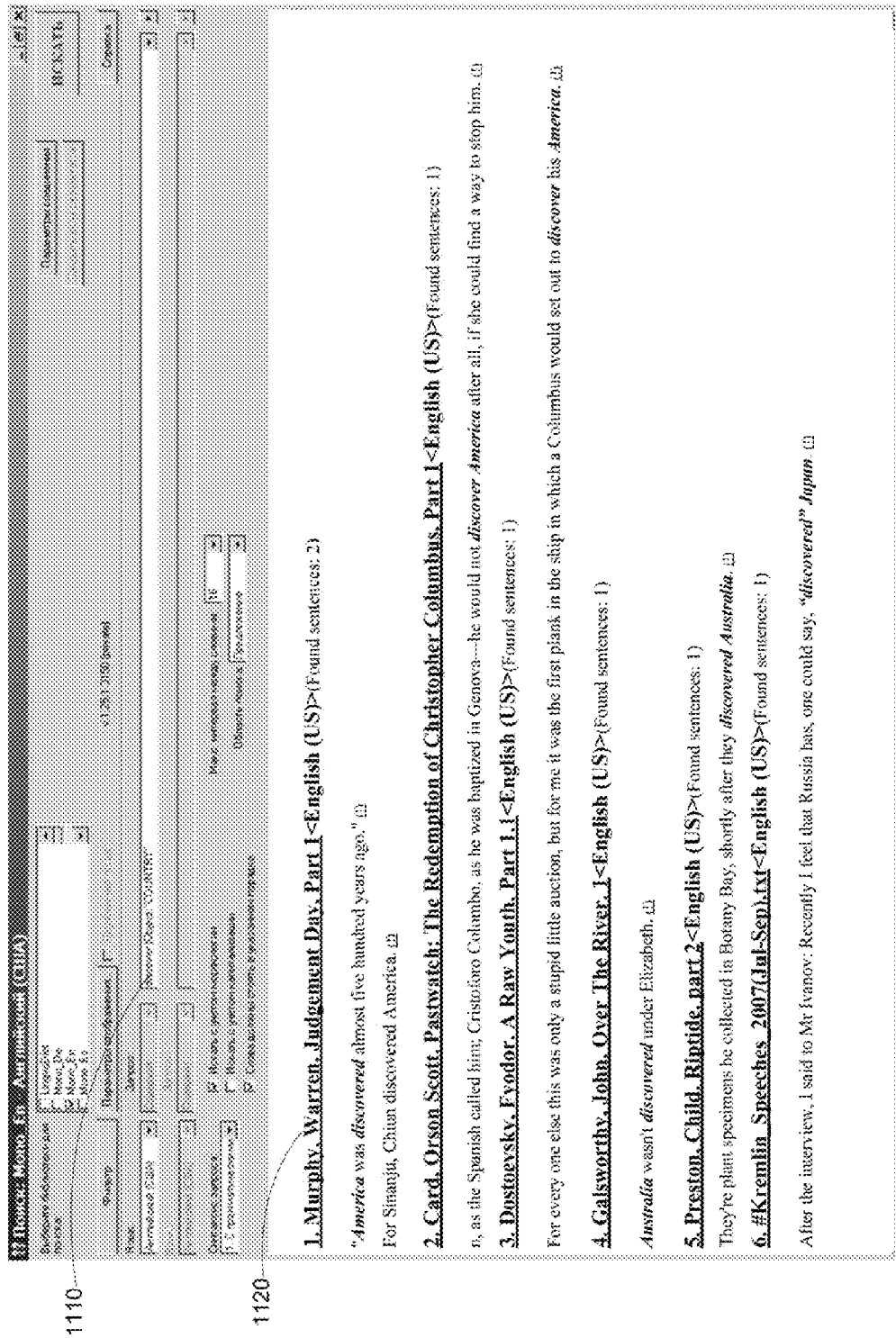
FIG. 11 shows an example of a search system interface which allows the user to formulate queries using semantic relations and semantic classes or lexical meanings that belong to a certain semantic class instead of conventional key words.

FIG. 11 shows an example of a search system interface that allows the user to formulate queries using semantic relations and lexical meanings that belong to a certain semantic class. The example of a query is shown on FIG. 11, really answers the question "What countries were discovered?" In terms of semantic query in the window 1110 it looks as "discover [Object:"COUNTRY"]", it means that the semantic search system will search sentences with the verb "discover" and the object that belongs to the semantic class COUNTRY. Results of search are shown in the window 1120.

Figure 12:
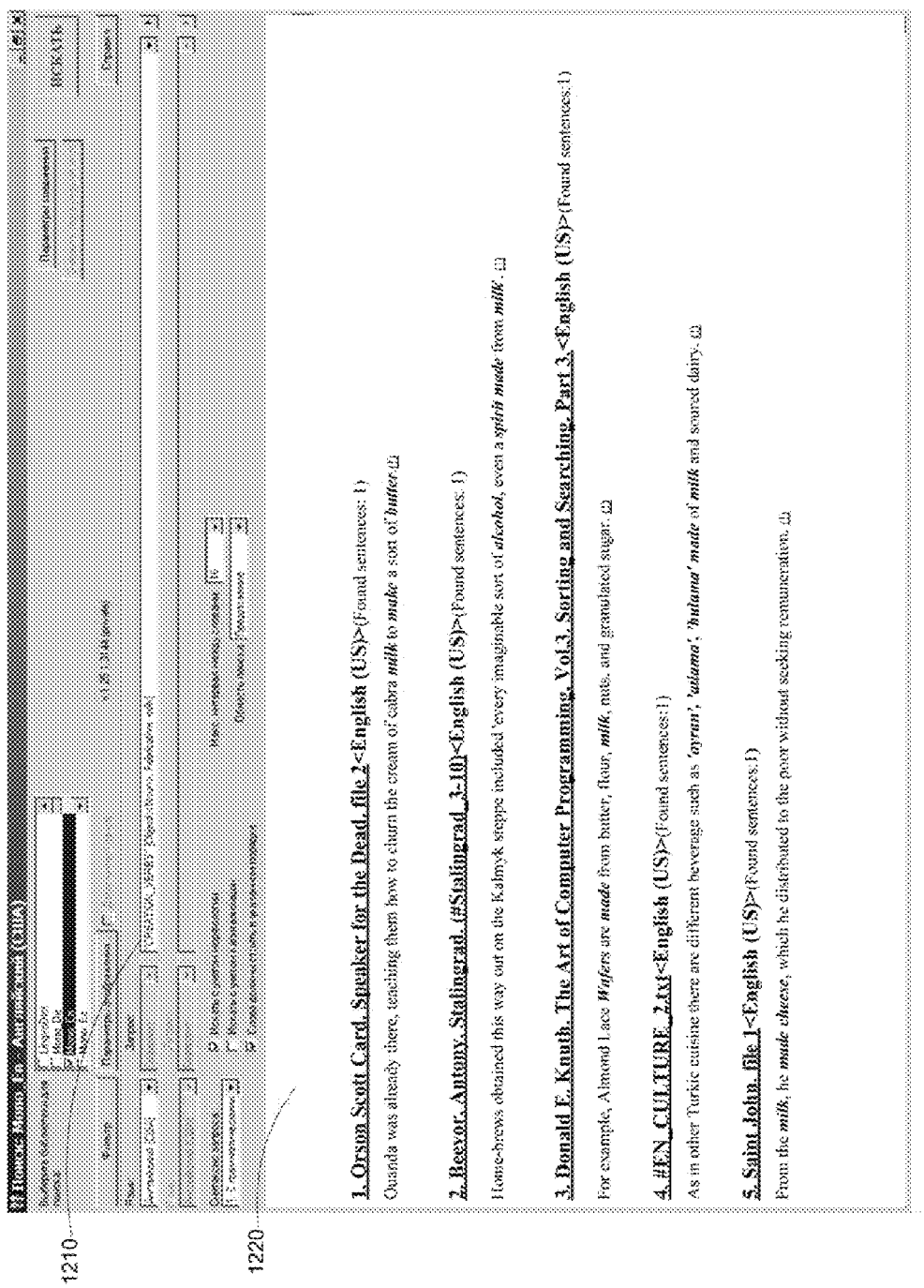
FIG. 12 shows another example of query using semantic relations and semantic classes or lexical meanings that belong to a certain semantic class.

Another example of a query is shown on FIG. 12, it answers the question "What can be made from milk?" In terms of semantic query in the window 1210 it looks as "CREATION_VERBS" [Object:<Noun>, Fabricative: milk]", where "CREATION_VERBS" is a semantic class of verbs denoting process of creation, such as "to make", "to produce", "to manufacture", "to confect" etc. Any of these and other verbs belonging to the semantic class "CREATION_VERBS" may be found in required sentences. "Fabricative" is a semantic role (semantic slot) that means "raw material", material from which something produced. In this case such "raw material" is milk. So, the result must be a <Noun> and it must fill the semantic slot "Object" in sentences. Results of search are shown in the window 1220.

Figure 13:
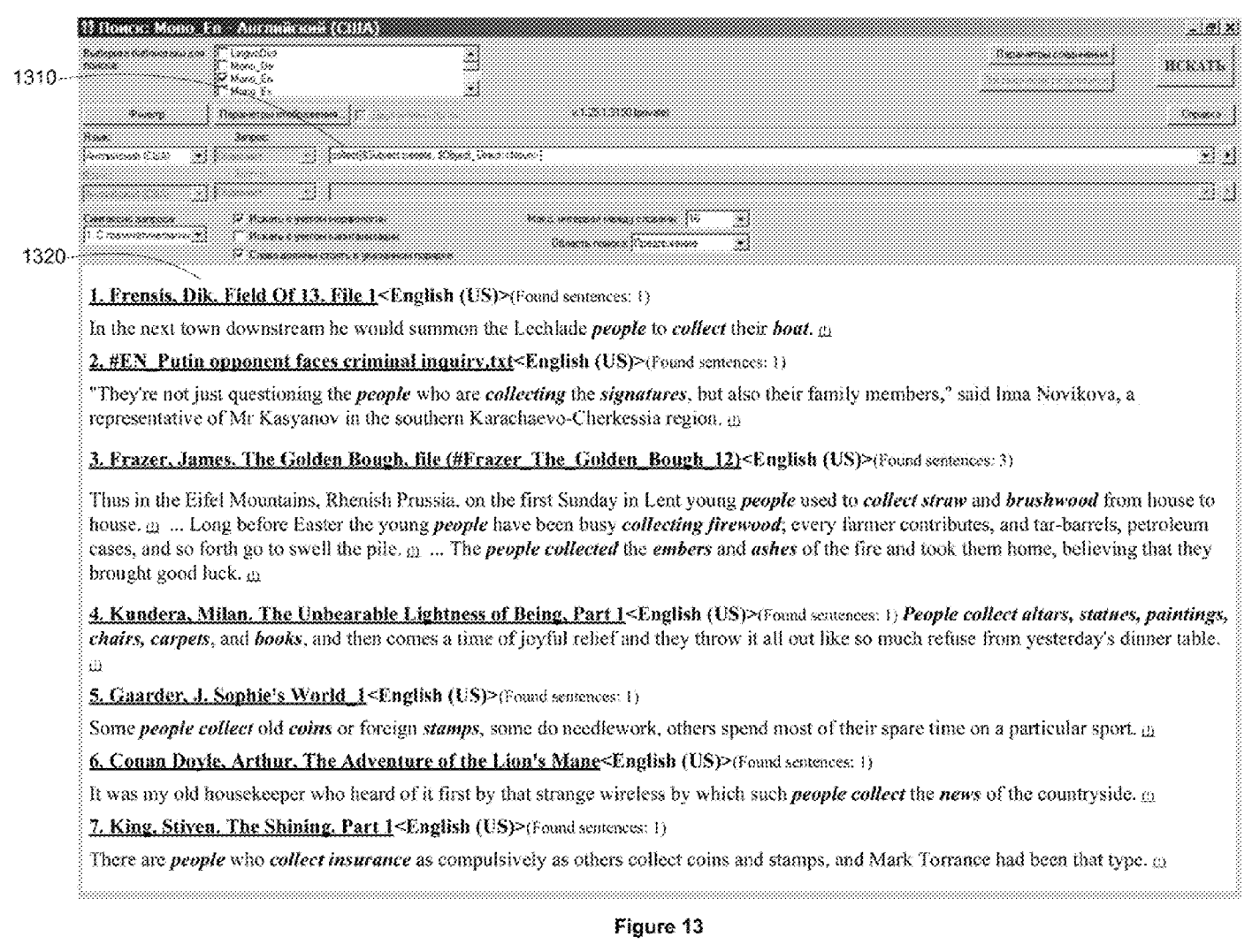

A still another example of a query to the semantic search system is shown on FIG. 13. This is the question "What do the people collect?" In terms of semantic query in the window 1310 it looks as "collect[$Subject:people, $Object_Direct: <Noun>]". The semantic search system will search sentences with the verb "collect" and the word "people" that fills the surface slot "Subject". The goal of the search is a noun (or nouns) in the role of the direct object of the verb "collect". Results of search are shown in the window 1320.

In one embodiment, all morphological forms of words involved in queries are taken into account, and all morphological forms of words may be found. The restrictions on morphological forms of words involved in queries and searched morphological forms may be specified as a restrictions on grammatical values in brackets < >.

The index produced in accordance with the techniques may be provisioned as part of a semantic search system, in accordance with one embodiment of the invention.

Embodiments of the present invention also disclose a semantic search technique wherein a user can formulate a question in a natural language. The same analysis techniques are then used to analyze the question, recognize its syntactical structure, and build its semantic structure, thereby to "understand" the meaning of the sentence. The constructed semantic structure is then translated into a query language for the semantic search system.

Figure 14:
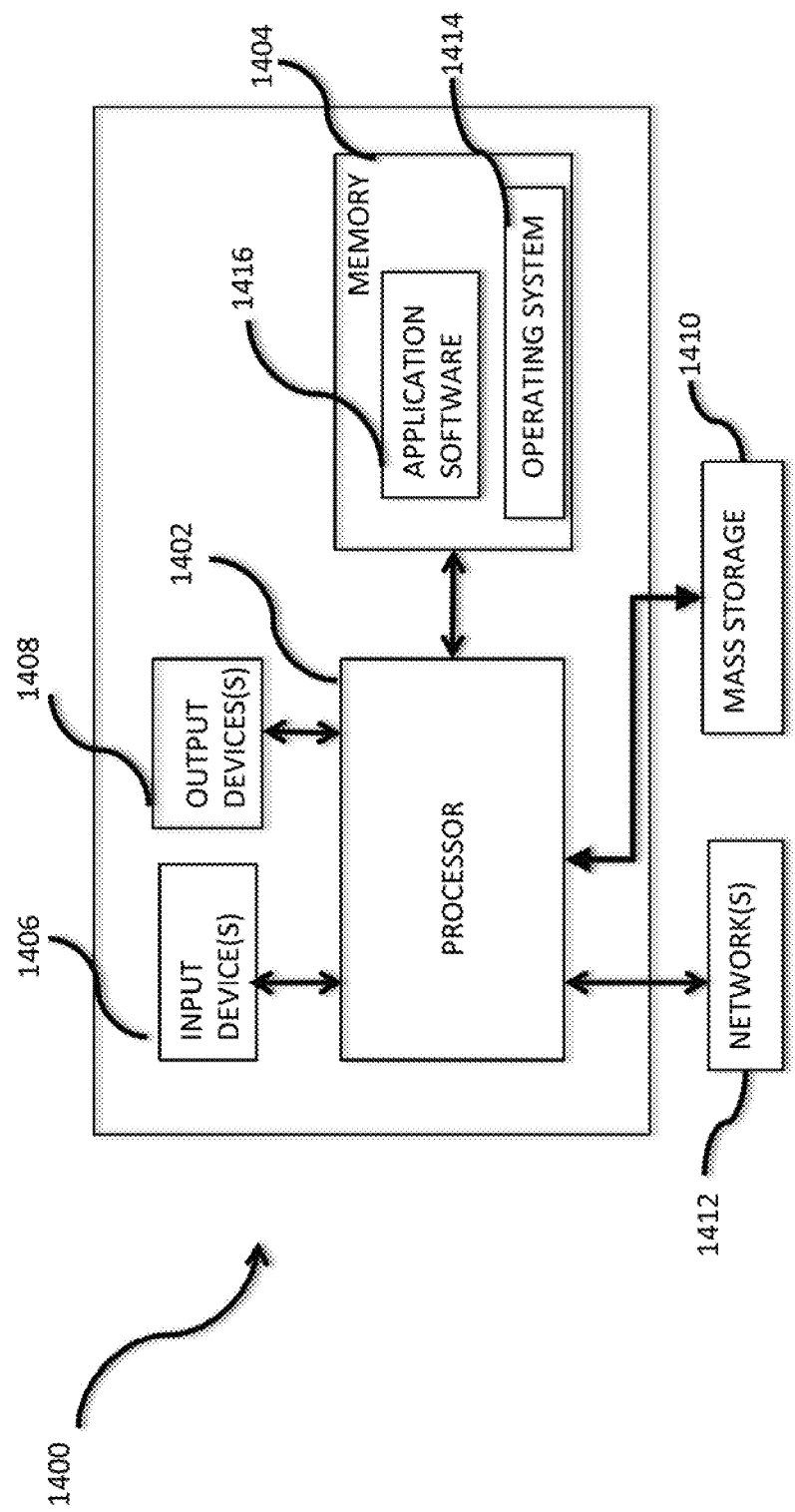
FIG. 14 shows exemplary hardware for implementing the searching system using the techniques described in this application, in accordance with an embodiment of the present disclosure.

FIG. 14 shows exemplary hardware for implementing the techniques and systems techniques described herein, in accordance with an embodiment of the present disclosure.

Referring to FIG. 14, the hardware 1400 typically includes at least one processor 1402 coupled to a memory 1404. The processor 1402 may represent one or more processors (e.g. microprocessors), and the memory 1404 may represent random access memory (RAM) devices comprising a main storage of the hardware 1400, as well as any supplemental levels of memory, e.g., cache memories, non-volatile or back-up memories (e.g. programmable or flash memories), read-only memories, etc. In addition, the memory 1404 may be considered to include memory storage physically located elsewhere in the hardware 1400, e.g. any cache memory in the processor 1402 as well as any storage capacity used as a virtual memory, e.g., as stored on a mass storage device 1410.

The hardware 1400 also typically receives a number of inputs and outputs for communicating information externally. For interface with a user or operator, the hardware 1400 may include one or more user input devices 1406 (e.g., a keyboard, a mouse, imaging device, scanner, etc.) and a one or more output devices 1408 (e.g., a Liquid Crystal Display (LCD) panel, a sound playback device (speaker). To embody the present invention, the hardware 1400 must include at least one screen device.

For additional storage, the hardware 1400 may also include one or more mass storage devices 1410, e.g., a floppy or other removable disk drive, a hard disk drive, a Direct Access Storage Device (DASD), an optical drive (e.g. a Compact Disk (CD) drive, a Digital Versatile Disk (DVD) drive, etc.) and/or a tape drive, among others. Furthermore, the hardware 1400 may include an interface with one or more networks 1412 (e.g., a local area network (LAN), a wide area network (WAN), a wireless network, and/or the Internet among others) to permit the communication of information with other computers coupled to the networks. It should be appreciated that the hardware 1400 typically includes suitable analog and/or digital interfaces between the processor 1402 and each of the components 1404, 1406, 1408, and 1412 as is well known in the art.

The hardware 1400 operates under the control of an operating system 1414, and executes various computer software applications, components, programs, objects, modules, etc. to implement the techniques described above. Moreover, various applications, components, programs, objects, etc., collectively indicated by reference 1416 in FIG. 14, may also execute on one or more processors in another computer coupled to the hardware 1400 via a network 1412, e.g. in a distributed computing environment, whereby the processing required to implement the functions of a computer program may be allocated to multiple computers over a network.

In general, the routines executed to implement the embodiments of the invention may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processors in a computer, cause the computer to perform operations necessary to execute elements involving the various aspects of the invention. Moreover, while the invention has been described in the context of fully functioning computers and computer systems, those skilled in the art will appreciate that the various embodiments of the invention are capable of being distributed as a program product in a variety of forms, and that the invention applies equally regardless of the particular type of computer-readable media used to actually effect the distribution. Examples of computer-readable media include but are not limited to recordable type media such as volatile and non-volatile memory devices, floppy and other removable disks, hard disk drives, optical disks (e.g., Compact Disk Read-Only Memory (CD-ROMs), Digital Versatile Disks (DVDs), flash memory, etc.), among others. Another type of distribution may be implemented as Internet downloads.

While certain exemplary embodiments have been described and shown in the accompanying drawings, it is to be understood that such embodiments are merely illustrative and not restrictive of the broad invention and that this invention is not limited to the specific constructions and arrangements shown and described, since various other modifications may occur to those ordinarily skilled in the art upon studying this disclosure. In an area of technology such as this, where growth is fast and further advancements are not easily foreseen, the disclosed embodiments may be readily modifiable in arrangement and detail as facilitated by enabling technological advancements without departing from the principals of the present disclosure.

The invention claimed is:

1. A computer-implemented method, comprising:
   preliminarily analyzing at least one corpus of natural language text comprising for each sentence of each natural language text of the corpus
      performing syntactic analysis using linguistic descriptions to generate at least one syntactic structure for the sentence, by
         performing a rough syntactic analysis on each sentence of each natural language text of the corpus to generate a graph of generalized constituents for each sentence,
         performing a precise syntactic analysis on the graph of generalized constituents to generate one or more syntactic trees to represent a corresponding sentence of a corresponding natural language text of the corpus, and
         selecting a best syntactic tree from the generated one or more syntactic trees to represent the at least one syntactic structure of the sentence; and
      building from the at least one syntactic structure of the sentence a language-independent semantic structure for the sentence thereby associating each generated syntactic structure and language-independent semantic structure with the sentence, wherein the semantic structure comprises semantic classes, sememtemes, and deep slots; and
   performing additionally for each corpus preliminarily analyzed, an indexing operation to index lexical meanings and values of linguistic parameters of each syntactic structure and each language-independent semantic structure associated with sentences of the corpus.

2. The computer-implemented method of claim 1, further comprising searching in response to a semantic search query.

3. The computer-implemented method of claim 2, where the semantic search query includes at least one lexical meaning.

4. The computer-implemented method of claim 2, where the semantic search query includes at least one value of the linguistic parameters where the linguistic parameters are selected from the group of descriptions consisting of semantic descriptions, syntactic descriptions, lexical descriptions, and morphological descriptions.

5. The computer-implemented method of claim 1, further comprising searching in response to a query in a natural language.

6. The computer-implemented method of claim 1, further comprising displaying results of said searching to a user.

7. The computer-implemented method of claim 6, further comprising displaying each semantic and syntactic structure associated with found sentences to the user.

8. The computer-implemented method of claim 1, further comprising searching in at least one preliminarily analyzed corpus for sentences comprising searched values for the linguistic parameters.

9. A system, comprising:
   a processor; and
   a memory coupled to the processor, the memory storing instructions which when executed by the processor cause system to perform a method, comprising
      preliminarily analyzing at least one corpus of natural language text comprising for each sentence of each natural language text of the corpus
         performing syntactic analysis using linguistic descriptions to generate at least one syntactic structure for the sentence, by
            performing a rough syntactic analysis on each sentence of each natural language text of the corpus to generate a graph of generalized constituents for each sentence,
            performing a precise syntactic analysis on the graph of generalized constituents to generate one or more syntactic trees to represent a corresponding sentence of a corresponding natural language text of the corpus, and
            selecting a best syntactic tree from the generated one or more syntactic trees to represent the at least one syntactic structure of the sentence;

building from the at least one syntactic structure of the sentence a language-independent semantic structure for the sentence thereby associating each generated syntactic structure and language-independent semantic structure with the sentence, wherein the semantic structure comprises semantic classes, semantemes, and deep slots; and performing additionally for each corpus preliminarily analyzed, an indexing operation to index lexical meanings and values of linguistic parameters of each syntactic structure and each language-independent semantic structure associated with sentences of the corpus.

10. The system of claim 9, wherein the method further comprises searching in response to a semantic search query.

11. The system of claim 10, where the semantic search query includes at least one lexical meaning.

12. The system of claim 10, where the semantic search query includes at least one value of the linguistic parameters where the linguistic parameters are selected from the group of descriptions consisting of semantic descriptions, syntactic descriptions, lexical descriptions, and morphological descriptions.

13. The system of claim 9, wherein the method further comprises searching in response to a query in a natural language.

14. The system of claim 9, wherein the method further comprises displaying results of said searching to a user.

15. The system of claim 14, wherein the method further comprises displaying each semantic and syntactic structure associated with found sentences to the user.

16. The system of claim 9, wherein the processor causes the system to further perform searching in at least one preliminarily analyzed corpus for sentences comprising searched values for the linguistic parameters.

17. A non-transitory computer-readable medium having stored thereon a sequence of instructions which when executed by a system, cause the system to perform a method, comprising:

preliminarily analyzing at least one corpus of natural language text comprising for each sentence of each natural language text of the corpus performing syntactic analysis using linguistic descriptions to generate at least one syntactic structure for the sentence, by performing a rough syntactic analysis on each sentence of each natural language text of the corpus to generate a graph of generalized constituents for each sentence, performing a precise syntactic analysis on the graph of generalized constituents to generate one or more syntactic trees to represent a corresponding sentence of a corresponding natural language text of the corpus, and selecting a best syntactic tree from the generated one or more syntactic trees to represent the at least one syntactic structure of the sentence;

building from the at least one syntactic structure of the sentence a language-independent a language-independent semantic structure for the sentence thereby associating each generated syntactic structure and language-independent semantic structure with the sentence, wherein the semantic structure comprises semantic classes, semantemes, and deep slots; and performing additionally for each corpus preliminarily analyzed an indexing operation to index lexical meanings and values of linguistic parameters of each syntactic structure and each language-independent semantic structure associated with sentences of the corpus.

18. The non-transitory computer-readable medium of claim 17, wherein the method further comprises searching in response to a semantic search query.

19. The non-transitory computer-readable medium of claim 17, wherein the method further comprises searching in at least one preliminarily analyzed corpus for sentences comprising searched values for the linguistic parameters.

* * * * *